May 11, 1926.

C. E. McMANUS 1,584,312

CORK TUBE SLICING MACHINE

Filed June 27, 1925

INVENTOR
Charles E. McManus
BY
Frank P. Wentworth
his ATTORNEY.

Patented May 11, 1926.

1,584,312

UNITED STATES PATENT OFFICE.

CHARLES E. McMANUS, OF NEW YORK, N. Y.

CORK-TUBE-SLICING MACHINE.

Application filed June 27, 1925. Serial No. 40,124.

The invention relates to cork tube slicing machines, and more particularly to a machine from which a strip of composition cork of substantially uniform thickness may be produced from a tube of such material.

Sheets of composition cork are extensively used in the manufacture of gaskets and other articles, such sheets being largely produced by slicing slabs formed of composition cork into sheets of the desired thickness.

In the production of such slabs, it has been found impossible to compact cork composition, consisting of granular cork, each granule of which has a thin coating of cement, adhesive, or binder, so as to secure the desired density in the product; and to bake the material to secure the desired bonding action of the adhesive, under conditions which will permit the formation of slabs of more than about one and a half inches in thickness, twenty inches in width, and about thirty to thirty-five inches in length. Under such conditions the size of the sheets of composition cork must of necessity be limited in length and width to the dimensions of the cork slabs, it being possible, however, to secure any desired thickness of the sheets, this thickness ordinarily being about one-tenth of an inch.
With sheets of the same length and width, there is sometimes excessive wastage in the subsequent cutting of the sheets, when making gaskets or other articles, and it is desirable to produce composition cork in strip form in order to permit articles of different sizes to be cut without unnecessary wastage.

Preparatory to the formation of the strips of composition cork, the cork composition is compacted and baked in molds having a tubular mold space, thus permitting the compacting of the composition cork in the mold in a manner which will ensure substantially uniform density, and the effective application of heat throughout the compacted mass in the mold without injury to the cork or to the cement, adhesive, or binder, or a failure of the desired bonding action centrally of the mass in the mold cavity.

After the mold has left the baker or vulcanizer, it is ejected from the mold by being pushed therefrom longitudinally thereof, there always being a possibility of the tube of composition cork expanding slightly after leaving the mold, and having a somewhat rough and slightly discolored outer surface.

A tube of composition cork formed as above, possesses a high degree of resiliency, and also contains a small amount of glycerine or glycerine substitute, which material serves somewhat as a lubricant when cutting the tube into strips by a machine of the invention.

As will appear from the foregoing, the machine of my invention is required to helically slice tubes formed of composition cork, which tubes possess a high degree of resiliency and may vary considerably as to their inside diameter, although the maximum range of variation will never be great. By reason of the resiliency of the material of the tube, I so construct the slicing machine as to subject the portion of the tube adjacent that upon which the slicing knife is operative, to a substantially uniform pressure throughout the entire length of the tube. This pressure is not dependent upon the diameter of the tube.

The compression member in the machine has the additional functions of assisting in the proper positioning of the tube in relation to the slicing knife and of rotating the tube by frictional engagement therewith.

In conjunction with said compression, positioning and feeding member, I provide an additional rotatable supporting member, which, with said compression member and a gauge bar for the band knife, affords three points of contact of the mechanisms of the machine with the tube. The gauge bar is for determining the thickness of the strip to be cut from the tube.

While the length of strip which may be produced from a tube, will vary with the thickness of the tube or the thickness of the strip, with a tube twenty-four inches in diameter and an inch and a half in thickness, a strip of a thickness of about one-tenth of an inch cut therefrom, will approximate ninety feet in length, so that it is desirable to provide a rewind reel upon which the strip as formed is wound, it being possible to wind a number of strips successively upon the same reel.

The invention consists primarily in a cork tube slicing machine embodying therein a cutting edge, means parallel with said cutting edge and spaced away therefrom so as to engage the exterior of a composition cork tube, a rotatable member extending substantially parallel with said cutting edge and said support and adapted to enter the opening of, and engage, the tube, means whereby said member may have movement substantially radially of the tube and toward said cutting edge, and means rotating said member; and in such other novel features of construction and combination of parts as are hereinafter set forth and described, and more particularly pointed out in the claims hereto appended.

Referring to the drawings.

Like numerals refer to like parts throughout the several views.

Figure 1:
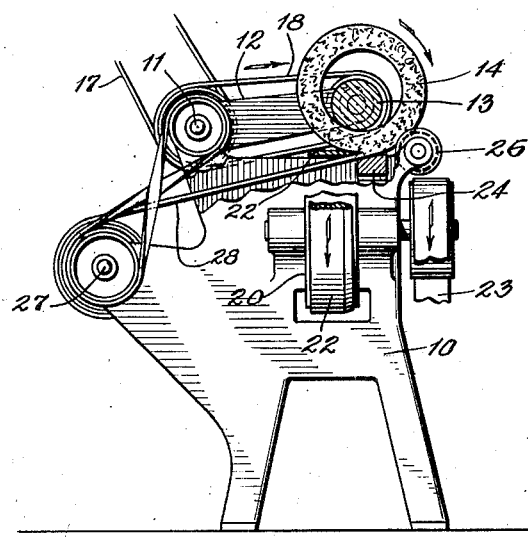
Fig. 1 is a side view of a machine embodying my invention, partly broken away.
Figure 2:
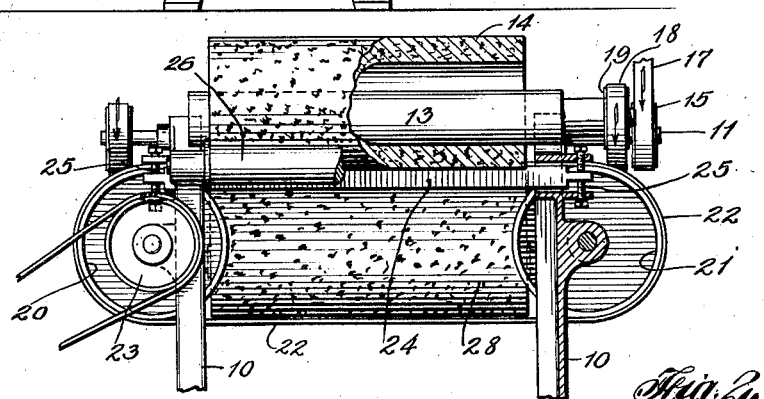
Fig. 2 is an end view thereof with the composition cork tube shown in section.
Figure 3:
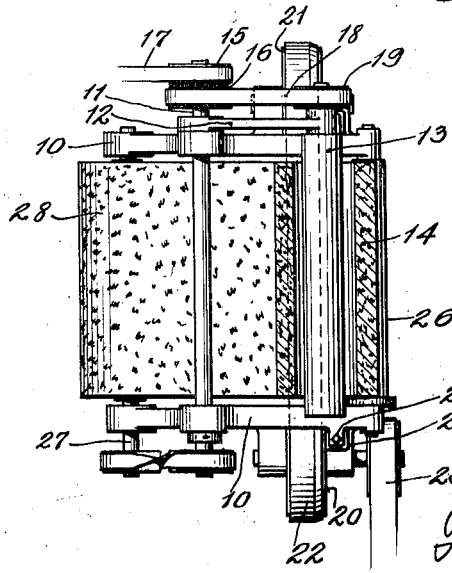
Fig. 3 is a plan view thereof.

In the embodiment of the invention shown in the drawings, 10 indicates the frame of the machine having at one side thereof an arbor 11. An arm 12 is pivoted on said arbor 11 so as to be capable of vertical pivotal movement. Journaled in said arm is a weighted cylinder 13, the diameter of which cylinder is relatively smaller than the opening of the composition cork tube, shown at 14 in the drawings. Mounted upon the journal of the arbor 11 are connected pulleys 15 and 16, one of which is driven by means of the belt 17 from any desired source of power, and the other of which is used for driving the cylinder 13 through a belt 18 and a pulley 19 upon the arbor of said cylinder 13.

Passing about suitable wheels 20 and 21 is a band knife 22, this knife being driven at high speed by means of the belt and pulley mechanism 23 receiving its power from any desired source. Adjacent the band knife 22 is a gauge bar 24 capable of vertical adjustment, as by the mechanism shown at 25, for the purpose of positioning this bar below the knife 22 a distance which will cause the knife to take the desired thickness of cut to produce a strip from the tube 14 of the desired thickness.

Carried by the frame 10 and extending parallel with the upper reach of the band knife 22 is a supporting roller 26, so positioned with relation to the weighted cylinder 13 as to afford three points of contact adjacent the bottom of the tube 14, to wit: the gauge bar 24 and the roller 26 upon the outside of the tube 14 and the cylinder 13 upon the inside of the tube exerting a constant uniform pressure toward the knife, so as to compress the composition cork in the tube as a result of the combined weight and the rotary movement of this cylinder, while imparting continuous rotary movement to the tube through the frictional engagement of the cylinder therewith.

Beyond the band knife 22 is a rewind reel 27 upon which the strip shown at 28 is wound as it is cut from the tube. The reel may be turned by hand by the operator of the machine who will also be required to inspect the product.

The operation of the herein described machine is substantially as follows:—

The material of the composition cork of which the tube 14 is composed is highly resilient so that under the weight of the cylinder 13 it will not only be compacted adjacent the cutting edge of the band knife 22, but will be shifted downwardly toward the gauge bar 24 and in relation to the band knife during the progress of the cutting of the thin strip from the tube.

When power is applied to the cylinder 13 in a direction to turn the lower diameter toward the knife 22, the friction between this cylinder and the interior of the tube, will cause the tube to rotate about an axis, which in addition to being eccentric to that of the cylinder 13, shifts downwardly as the outside diameter of the roll diminishes, and also shifts towards the knife so as to secure the desired spiral or helical cut. The gauge bar 24 will serve to control these movements of the tube, which are caused by the weighted cylinder 13 of relatively smaller diameter than the opening through the tube. The compressibility of the material of the tube is also a factor.

The roller 26 will form one of three points of contact, two of which are upon the outside and one upon the inside of the tube 14, the shape of the gauge bar 24 being such as to permit that slight deformation of the material of the tube incidental to the spiral trend of the cut by the knife 22.

As the severed strip passes below the knife 22, the operator takes the end thereof and winds it upon the rewind reel 27 so that the strip is wound upon this reel as it is formed. The cutting operation is continuous until the final cut is made.

In mounting a tube on a cylinder 13, it is merely necessary to slip it over the end of the cylinder, the tube being raised away from the gauge bar 24 to afford the necessary clearance for the passage of the tube over this cylinder.

The pressure exerted by the cylinder during the operation of the machine is substantially above the cutting edge of the knife and toward the depressed portion of the gauge bar 24.

The exact proportion of parts is not adhered to in the accompanying drawings, wherein the strip 28 is too thick in relation to the tube and the other parts of the machine. The thickness of the wall of the tube is also disproportionate to the diameter of the tube, this wall as stated being from an inch to an inch and a half in thickness, and the tube being approximately twenty-four inches in diameter.

It is, therefore, not my intention to limit the invention to the details of construction shown in the drawings, it being apparent that the dimensions thereof are not to a proper relative scale, and may, therefore, be varied indefinitely while preserving the same mode of operation in the machine to secure the same results.

Having described the invention, what I claim as new and desire to have protected by Letters Patent, is:—

1. A cork tube slicing machine embodying therein a cutting edge, means parallel with said cutting edge and spaced away therefrom so as to engage the exterior of a composition cork tube, a rotatable member extending substantially parallel with said cutting edge and said support and adapted to enter the opening of, and engage, the tube, means whereby said member may have movement substantially radially of the tube and toward said cutting edge, and means for rotating said member.

2. A cork tube slicing machine embodying therein a cutting edge, means parallel with said cutting edge and spaced away therefrom so as to engage the exterior of a composition cork tube, a rotatable member extending substantially parallel with said cutting edge and said support and adapted to enter the opening of, and engage, the tube, means whereby said member may have movement substantially radially of the tube and toward said cutting edge, means for rotating said member, and a gauge bar adjacent and below said cutting edge, and below said rotatable member, whereby said rotatable member will constantly exert a compressive stress upon the material of said tube against said gauge bar and force said tube toward said cutting edge while imparting rotary movement thereto.

3. A cork tube slicing machine embodying therein a cutting edge, a rotatable member parallel with said cutting edge and spaced away therefrom so as to engage the exterior of a composition cork tube, a weighted rotatable member extending substantially parallel with said cutting edge and said support and adapted to enter the opening of, and engage, the tube, a pivotally mounted arm on which said member is rotatably mounted, whereby said member may have movement substantially radially of the tube and toward said cutting edge, means for rotating said member, and a gauge bar adjacent and below said cutting edge, and below said rotatable member, whereby said rotatable member will constantly exert a compressive stress upon the material of said tube against said gauge bar and force said tube toward said cutting edge while imparting rotary movement thereto.

4. A cork tube slicing machine embodying therein a cutting edge, a rotatable member parallel with said cutting edge and spaced away therefrom so as to engage the exterior of a composition cork tube, a weighted rotatable member extending substantially parallel with said cutting edge and said support and adapted to enter the opening of, and engage, the tube, a pivotally mounted arm on which said member is rotatably mounted, whereby said member may have movement substantially radially of the tube and toward said cutting edge, means for rotating said member, a gauge bar adjacent and below said cutting edge, and below said rotatable member, whereby said rotatable member will constantly exert a compressive stress upon the material of said tube against said gauge bar and force said tube toward said cutting edge while imparting rotary movement thereto, and means whereby said gauge bar may be adjusted with relation to said cutting edge to vary the thickness of the strip to be cut.

5. A cork tube slicing machine embodying therein a band knife, means imparting travel thereto, a rotatable member parallel with said band knife and spaced away therefrom so as to engage the exterior of a composition cork tube, a weighted rotatable member extending substantially parallel with said band knife and said support and adapted to enter the opening of, and engage, the tube, a pivotally mounted arm on which said member is rotatably mounted, whereby said member may have movement substantially radially of the tube and toward said band knife, means for rotating said member, a gauge bar adjacent and below said band knife, and below said rotatable member, whereby said rotatable member will constantly exert a compressive stress upon the material of said tube against said gauge bar and force said tube toward said band knife while imparting rotary movement thereto, and means whereby said gauge bar may be adjusted with relation to said band knife to vary the thickness of the strip to be cut.

6. A cork tube slicing machine embodying therein a band knife, means imparting travel thereto, a rotatable cylinder parallel with said band knife and spaced away therefrom so as to engage the exterior of a composition cork tube, a weighted rotatable cylinder extending substantially parallel with said band knife and said support and adapted to enter the opening of, and engage, the tube, a pivotally mounted arm on which said cylinder is rotatably mounted, whereby said cylinder may have movement substantially radially of the tube and toward said band knife, means for rotating said cylinder, a gauge bar adjacent and below said band knife, and below said rotatable cylinder, whereby said rotatable cylinder will constantly exert a compressive stress upon the material of said tube against said gauge bar and force said tube toward said band knife while imparting rotary movement thereto, and means whereby said gauge bar may be adjusted with relation to said band knife to vary the thickness of the strip to be cut.

In witness whereof I have hereunto affixed my signature, this 22nd day of June, 1925.

CHARLES E. McMANUS.